(12) United States Patent
Poshusta et al.

(10) Patent No.: US 8,614,023 B2
(45) Date of Patent: Dec. 24, 2013

(54) SOLID OXIDE FUEL CELL SYSTEMS WITH HOT ZONES HAVING IMPROVED REACTANT DISTRIBUTION

(71) Applicant: Protonex Technology Corporation, Southborough, MA (US)

(72) Inventors: Joseph C. Poshusta, Broomfield, CO (US); Charles W. Booten, Arvada, CO (US); Jerry L. Martin, Superior, CO (US)

(73) Assignee: Protonex Technology Corporation, Southborough, MA (US)

( * ) Notice: Subject to any disclaimer, the term of this patent is extended or adjusted under 35 U.S.C. 154(b) by 0 days.

(21) Appl. No.: 13/645,054

(22) Filed: Oct. 4, 2012

(65) Prior Publication Data

US 2013/0040216 A1 Feb. 14, 2013

Related U.S. Application Data

(62) Division of application No. 12/367,168, filed on Feb. 6, 2009, now Pat. No. 8,304,122.

(51) Int. Cl.
*H01M 8/06* (2006.01)
*H01M 8/24* (2006.01)
*H01M 8/04* (2006.01)

(52) U.S. Cl.
USPC ............ 429/425; 429/456; 429/441; 429/512

(58) Field of Classification Search
USPC .................. 429/425, 441, 456, 512
See application file for complete search history.

(56) References Cited

U.S. PATENT DOCUMENTS

| | | | |
|---|---|---|---|
| 6,221,522 B1 | 4/2001 | Zafred et al. | |
| 6,306,531 B1 | 10/2001 | Clingerman et al. | |
| 6,485,852 B1 | 11/2002 | Miller et al. | |
| 6,492,050 B1 | 12/2002 | Sammes | |
| 6,608,463 B1 | 8/2003 | Kelly et al. | |
| 6,627,339 B2 | 9/2003 | Haltiner, Jr. | |
| 7,001,682 B2 | 2/2006 | Haltiner, Jr. | |
| 2004/0195782 A1 | 10/2004 | Bram et al. | |
| 2006/0127725 A9 * | 6/2006 | Sarkar et al. | 429/31 |
| 2007/0037028 A1 * | 2/2007 | Chiang et al. | 429/26 |
| 2007/0099065 A1 | 5/2007 | Rawson et al. | |
| 2007/0237998 A1 | 10/2007 | Armstrong et al. | |
| 2013/0040216 A1 | 2/2013 | Poshusta et al. | |

FOREIGN PATENT DOCUMENTS

EP 1966850 A2 9/2008
WO 2007/076440 A2 7/2007

* cited by examiner

*Primary Examiner* — Karie O'Neill Apicella
(74) *Attorney, Agent, or Firm* — Edwards Wildman Palmer LLP; Christine C. O'Day; George N. Chaclas

(57) ABSTRACT

A Solid Oxide Fuel Cell (SOFC) system having a hot zone with a center cathode air feed tube for improved reactant distribution, a CPOX reactor attached at the anode feed end of the hot zone with a tail gas combustor at the opposing end for more uniform heat distribution, and a counter-flow heat exchanger for efficient heat retention.

15 Claims, 3 Drawing Sheets

SOLID OXIDE FUEL CELL SYSTEMS WITH HOT ZONES HAVING IMPROVED REACTANT DISTRIBUTION

STATEMENT OF GOVERNMENT INTEREST

This invention was made with Government support under government contract DE-FC36-04GO14318 awarded by the Department of Energy to Protonex Technology LLC. The Government may have certain rights in the invention.

BACKGROUND OF THE INVENTION

1. Field of the Invention

The subject disclosure relates to fuel cells, and more particularly to solid oxide fuel cell systems having hot zones with improved reactant distribution, more uniform heat distribution, and/or more efficient heat retention.

2. Background of the Related Art

Referring to FIG. 1, a schematic view of a generator 110 with a hot zone 112 is shown. The generator 110 has an electrochemical stack or solid oxide fuel cell (SOFC) 120 typically operating at temperatures above 600° C. Several other support components are also operating at elevated temperature.

Commonly, the SOFC 120 is located within a hot environment to facilitate proper operation. In some instances, an external furnace could provide a hot environment but the furnace size, weight, and power consumption may negate most practical benefits in many applications. For example, for practical portable power generation applications, the SOFC 120 is preferably able to maintain stack temperature and operating environment in a compact and efficient package.

To accomplish maintaining the endothermic components at sufficient temperature, the SOFC 120 has an area of integration of the elevated temperature components, referred to as the hot zone 112. The hot zone 112 is insulated to reduce heat loss and maintain the desired operating temperature. The components of the hot zone 112 include a fuel processing reactor such as, without limitation, a catalytic partial oxidation (CPOX) reactor 114 for converting the system feed hydrocarbon fuel to a hydrogen and carbon monoxide rich feed for the stack 120 of the generator 110. For example, the CPOX reactor may convert a hydrocarbon fuel like propane or diesel to hydrogen and carbon monoxide by reaction with air over a catalyst. The CPOX product gases are then fed to the anode side of the SOFC stack 120. For liquid fuels, the feed hydrocarbon fuel is readied for the CPOX reactor 114 by using an atomizer or vaporizer.

The hot zone 112 also includes an exothermic tail gas combustor 116 that burns the remaining unutilized fuel from the stack 120 to reduce CO emissions and also to utilize the remaining fuel energy in the form of heat within the hot zone 112. For example, some hydrogen and carbon monoxide are oxidized with oxygen that is transported across the SOFC electrolyte (not shown explicitly) from the air on the cathode side of the SOFC stack 120. This remaining hydrogen and carbon monoxide are mixed with cathode exhaust in the tail gas combustor 116 for burning in a homogenous flame and/or over a catalyst.

The tail gas combustor exhaust enters a recuperator 118 where the gas is cooled by exchanging heat with the incoming cathode air. The recuperator heat exchanger 118 maintains heat within the hot zone 112 by transferring heat from the SOFC exhaust gas to the inlet stack air.

A power conditioning unit 124 also connects to the electrochemical stack 120. A CPOX air blower 126 provides air to the CPOX reactor 114. A fuel pump 130 expels fuel from a fuel tank 128 to the vaporizer 122. A cathode blower 132 provides air to the recuperator 118 and cathode side of the electrochemical stack 120.

The approach of FIG. 1 has several disadvantages. Each component requires piping to connect to the neighboring component. This plumbing requires a high temperature sealing method such as brazing or welding, a very labor intensive and extremely difficult to automate process. Each hot zone component also requires special features for braze or weld joints to the attached piping. These special features are typically machined, and result in high cost components.

Further, some stack components are ceramic, and sealing metal-to-ceramic joints is difficult such as shown in U.S. Patent Application Publication No. 2004/0195782 published on Oct. 7, 2004. The hot CPOX reactor 114 and tail gas combustor 116 are located away from the electrochemical stack 120, which slows heating at startup. Assembling and joining these components in close proximity is difficult and requires packing a large volume in a small space. Consequently, the support components can undesirably occupy as much hot zone volume as the electrochemical stack 120. The inability to closely integrate the hot zone components leads to a low hot zone power density and uneven distribution of heat. Further, the large insulation surface around the hot zone 112 may increase heat loss.

High fuel utilization is particularly desirable for high generator efficiency. The generator 110 cannot alone utilize the fuel unless the SOFC 120 is impractically large. Thus, the performance of the tail gas combustor 116 is particularly important and serves as a source of thermal energy that can be used for other needs. For instance, the thermal energy can keep the stack 120 at operating temperature and balance heat losses through insulation and system exhaust.

U.S. patent application Ser. No. 12/006,688, filed on Jan. 4, 2008 (the '688 Application), also recognized many shortcomings of the prior art and provided improvements thereto. The '688 Application disclosed a solid oxide fuel cell system including a main plate, an inner cylinder attached to the main plate, an intermediate cylinder attached to the main plate such that the intermediate cylinder contains a cathode air stream, and an outer cylinder attached to the main plate. An exhaust annular gap is formed between the intermediate and outer cylinders such that hot exhaust gases co-flow through the exhaust annular gap and heat is transferred from the hot exhaust gases to the cathode air stream.

The hot zone 112 provides key functions to support the SOFC stack operation including even temperature distribution throughout the stack volume, even flow distribution of fuel gases to the anodes of all cells in the stack and even flow distribution of air to the cathodes of all cells in the stack. Combustion of unutilized fuel in the stack exhaust may also occur in the hot zone. Preferably, there are minimal thermal losses through conduction across the hot zone boundaries and minimal thermal losses through hot exhaust gases.

Another function of the hot zone 112 is to maintain stack operating temperature within an appropriate range. Stack operating temperature must be high enough to maximize electrolyte ionic conductivity and prevent carbon formation. Stack temperature must not be too high, however, to avoid lowering the open circuit potential, increasing the electrolyte electrical conductivity, and initiating thermal degradation of cell or system materials. These temperature limits depend on the materials used in the cells and stack, and an exemplary ideal temperature range might be between 700 and 800° C.

Keeping all cells in the stack 120 within such a temperature range requires a design that minimizes thermal gradients in the stack.

U.S. Pat. No. 6,492,050, issued on Dec. 10, 2002 to Sammes, attempted to provide an integrated solid oxide fuel cell and reformer. However, the heat exchanger design of Sammes has little surface area, which leads to poor performance. Also the Sammes system is thermally unbalanced not only axially but radial temperature variation is also significant with regions of stagnant air.

SUMMARY OF INVENTION

It is an object of the subject technology to provide a SOFC system with a CPOX reactor configured such that the CPOX reactor is run at a desirable operating temperature and the CPOX catalyst temperature is not excessively high. It is another object of the subject technology to utilize a CPOX reactor with an atomizer to allow feeding liquid fuels to the SOFC system. Preferably, the CPOX reactor tube diameter and length can be freely set. In order to accommodate any fuel feed mechanism, the CPOX reactor may be located in, partially in or outside the hot zone.

It is still another object of the subject technology to locate the CPOX reactor at a boundary of, partially outside or even outside of the hot zone to reduce or control preheating and enable liquid fuel feed. Preferably, the feed end of the CPOX reactor is easily accessed and not obstructed by other hot zone structures.

It is still another object of the subject technology to have a more uniform temperature distribution within the stack. In one embodiment, the CPOX reactor and tail gas combustion heat sources are on opposing ends of the stack.

It is another object of the subject technology to have a more uniform radial temperature distribution in the stack.

It is yet another object of the subject technology to provide uniform air flow on the cathode side in the radial directions while minimizing regions of stagnant air. One embodiment uses a central feed tube.

It is still another object of the subject technology to increase thermal recuperation effectiveness by using counter-flow heat exchanger designs.

In one embodiment, the subject technology is directed to a solid oxide fuel cell system including an elongated stack having a first end and a second end. The stack includes a plurality of tubular cells, each cell having an inner radius configured as an anode electrode portion and an outer radius configured as a cathode electrode portion. A support plate retains the stack and a feed can couples to the support plate to form an anode feed plenum adjacent the first end of the stack. A catalytic partial oxidation (CPOX) reactor is in fluid communication with the anode feed plenum for receiving a hydrocarbon fuel and air mixture to provide a hydrogen and carbon monoxide rich fuel anode feed stream to the anode feed plenum, wherein the anode feed plenum is in fluid communication with the stack so that the anode feed stream passes through the tubular cells to become an anode exhaust.

The cathode air feed tube may extend from the first end to the second end of the stack to distribute radial flow evenly along the length of the tubular cells. The feed tube may also define a plurality of holes designed and positioned to achieve a desired air flow distribution. For example, the plurality of holes may increase in size toward the second end of the stack. The solid oxide fuel cell system may further include an exhaust end tube sheet for further supporting the stack as well as an exhaust can that forms an anode exhaust plenum with the exhaust end tube sheet. The exhaust can may define an anode exhaust hole. A cathode chamber can depends from the support plate and surrounds the stack and the exhaust can while defining an exhaust gas hole near the anode exhaust hole to form a region in which the anode exhaust and the cathode exhaust mix to form a mixed exhaust stream. The solid oxide fuel cell system may also include a tail gas combustor catalyst at the second end of the stack for oxidizing unutilized fuel in the mixed exhaust stream. It is envisioned that the second end of the stack may be without a catalyst but still form a tail gas combustion zone wherein homogenous combustion occurs.

In another embodiment, the subject technology is directed to a solid oxide fuel cell system including an elongated stack having a first end and a second end, the stack including a plurality of tubular cells, each cell having an inner radius configured as an anode and an outer radius configured as a cathode, and a feed tube extending substantially centrally through the stack for providing a cathode feed stream across the tubular cells to become a cathode exhaust. The solid oxide fuel cell may also include a feed can coupled to the stack to form an anode feed plenum adjacent the first end of the stack, and a CPOX reactor in fluid communication with the anode feed plenum for receiving a hydrocarbon fuel and providing an anode fuel stream to the anode feed plenum, wherein the anode feed plenum is in fluid communication with the stack so that the anode fuel stream passes through the tubular cells to become an anode exhaust.

In still another embodiment, the solid oxide fuel cell system further includes an exhaust end tube sheet with an exhaust can depending therefrom. A sheath sealingly surrounds the feed tube and sealingly couples to the exhaust end tube sheet so that an anode exhaust plenum is formed at the lower end of the stack within the exhaust can. As a result, detrimental homogenous combustion will not occur at the bottom of the stack and a reducing environment is maintained about the electrical interconnects. Further, in the event that the system were laid on its side, the sheath and, thereby, the exhaust end tube sheet would carry some of the load of the stack to help prevent damage.

The exhaust can also defines an anode exhaust hole, wherein the feed tube extends through the anode exhaust hole, and a cathode chamber can depending from the support plate and surrounding the stack and the exhaust can. The cathode chamber can defines an exhaust gas hole near the anode exhaust hole to form a region in which the anode exhaust and the cathode exhaust mix to form a mixed exhaust stream.

In yet another embodiment, the subject technology is a solid oxide fuel cell system including a main plate, an elongated stack depending from the main plate, the stack having a first end adjacent the main plate and a second end opposing the first end. A cathode chamber can depends from the main plate and surrounds the elongated stack, the cathode chamber can defining an exhaust gases hole adjacent the second end. A recuperator can depends from the main plate and surrounds the cathode chamber can to form a first annular gap there between and at least one exhaust port near the first end of the stack. An outer can depends from the main plate and surrounds the recuperator can to form a second annular gap there between and at least one inlet port near the first end of the stack for receiving an inlet cathode stream. A cathode feed tube receives the inlet cathode stream near a second end of the stack such that a counter-flow recuperator is formed between the first and second annular gaps by an exhaust stream passing from the exhaust gas hole to the at least one exhaust gas port.

The solid oxide fuel cell may also include a feed can coupled to the main plate for defining an anode air stream plenum adjacent the first end of the stack, the anode air stream plenum being in fluid communication with the stack as well as a CPOX reactor in fluid communication with the anode feed plenum for receiving a liquid fuel and providing an anode fuel stream to the anode feed plenum. A thermal balance may be controlled by adjusting a cathode flow rate through the at least one inlet port and a fuel feed rate into the stack. The solid oxide fuel cell system may also include a tail gas combustor between the recuperator can and cathode chamber can. The main plate may be planar and substantially circular. The outer can may be generally tubular with a largely open end and closed end. The recuperator can may be generally tubular with a largely open end and substantially closed end. The cathode chamber can may be generally tubular with a largely open end and substantially closed end.

It should be appreciated that the present invention can be implemented and utilized in numerous ways, including without limitation as a process, an apparatus, a system, a device, and a method for applications now known and later developed. These and other unique features of the system disclosed herein will become more readily apparent from the following description and the accompanying drawings.

BRIEF DESCRIPTION OF THE DRAWINGS

So that those having ordinary skill in the art will more readily understand how to make and use the same, reference may be had to the following drawings.

DETAILED DESCRIPTION OF PREFERRED EMBODIMENTS

The present invention overcomes many of the prior art problems associated with hot zone integration in fuel cell systems. The advantages, and other features of the systems and methods disclosed herein, will become more readily apparent to those having ordinary skill in the art from the following detailed description of certain preferred embodiments taken in conjunction with the drawings which set forth representative embodiments. All relative descriptions herein such as inner, outer, upward, downward, top, bottom, left, right, up, and down are with reference to the Figures, and not meant in a limiting sense.

Figure 1:
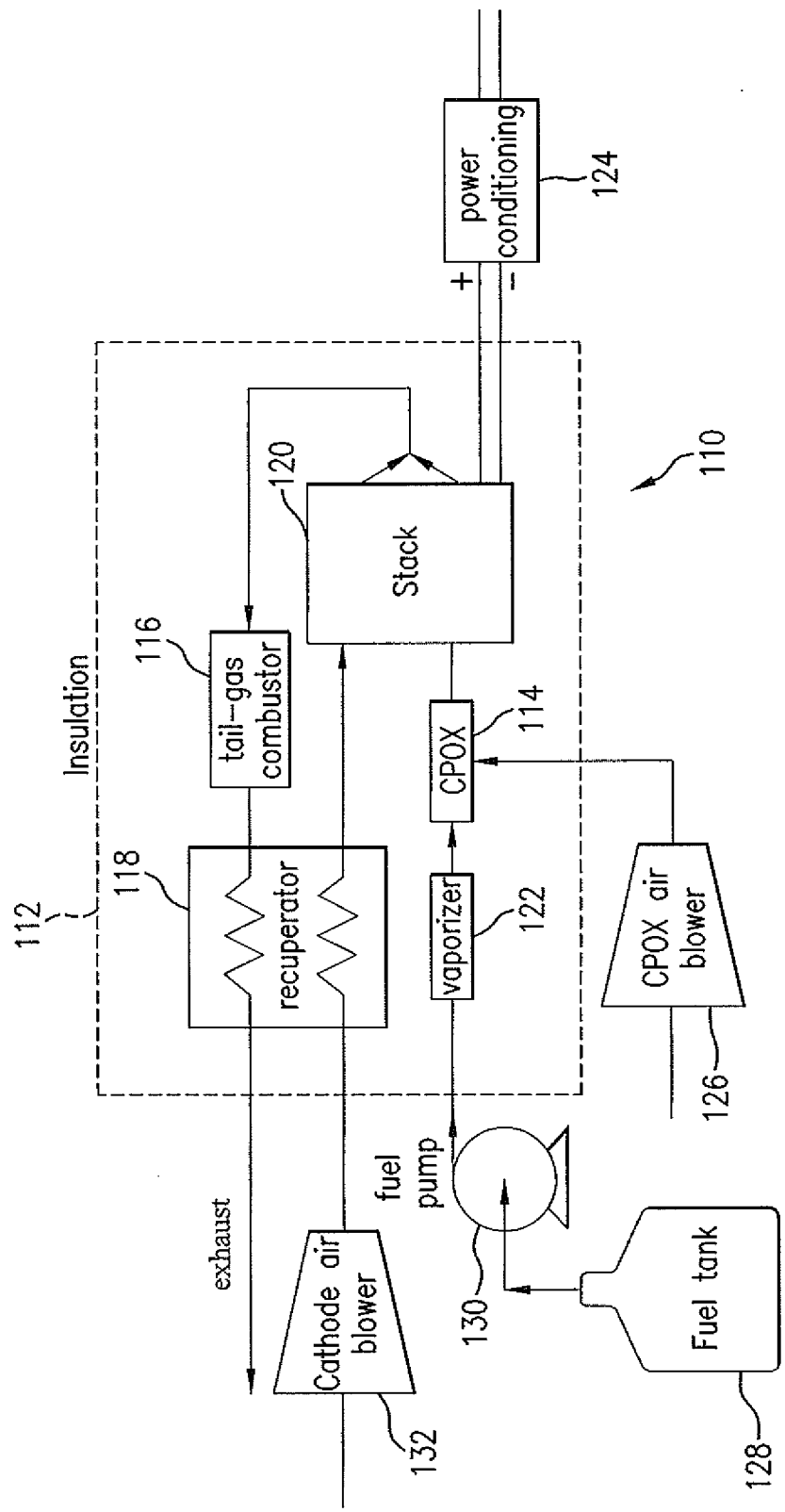
FIG. 1 is a schematic view of a generator using a solid oxide fuel cell (SOFC) system with a hot zone.
Figure 2:
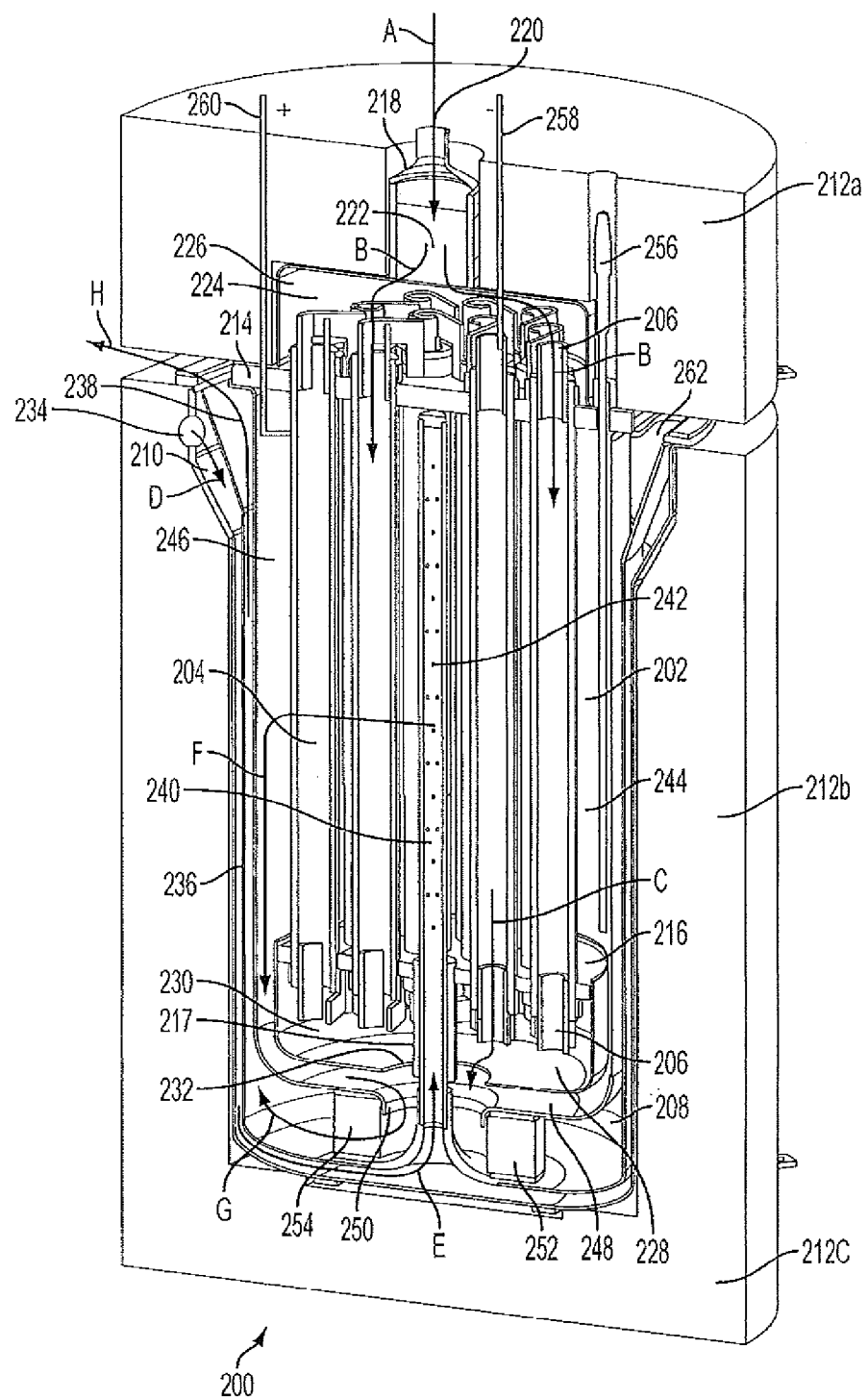
FIG. 2 is a cross-sectional view of a SOFC system with an improved hot zone with improved reactant distribution in accordance with the subject technology.

Referring now to FIG. 2, a cross-sectional view of a SOFC system 200 constructed in accordance with the subject technology is shown. The SOFC system 200 includes an elongated stack 202 that consists of a bundle of tubes or tubular cells 204. The tubular cells 204 are connected by interconnects 206 in accordance with the technology disclosed in co-pending, co-owned U.S. patent application Ser. No. 11/895,333, filed Aug. 24, 2007, entitled Electrical Interconnects for a Solid Oxide Fuel Cell Stack. The elongated stack 202 has the tubular cells 204 connected in series on both ends but alternative versions may only be connected at only one end. The SOFC tubes 204 are arranged in a concentric hexagonal pattern in two rows with the inner row having six SOFC tubes 204 and the outer row having twelve SOFC tubes 204. Each SOFC tube 204 has an anode electrode on the inside and a cathode electrode on the outside. Much larger stacks may be made by adding more SOFC tubes 204 in successive rings. The bundle of tubular cells 204 is retained in an outer can 210. The outer can 210 is surrounded by insulation 212a-c to retain heat therein and, thus, form a hot zone 208 therein. The SOFC tubes 204 are mechanically supported by an anode feed end tube sheet 214 at a top end within the hot zone 208. If the SOFC system 200 were laid on its side, an exhaust end tube sheet 216 would carry some of the load and protect the SOFC tubes 204 from breakage.

FIG. 2 includes arrows A-H to indicate flowpaths through the SOFC system 200. The position and configuration of the arrows A-H are to be informative as to how fluid passes through the SOFC system 200 and not meant in a limiting sense. For clarity, only certain flowpaths have been denoted by arrows A-H as would be appreciated by those of ordinary skill in the art based upon review of the subject disclosure. In general, the flow paths are cylindrically symmetric with regard to the central axis of the hot zone 208 except at the cathode air inlets 234.

Anode Flow

The CPOX reactor 218 intakes fuel and air via a feed port 220 for flow across a CPOX catalyst 222 as denoted by arrow A. Fuel, such as propane, is premixed with air and reacted with ambient air over the CPOX catalyst 222 to produce a SOFC fuel gas stream composed of primarily hydrogen, carbon monoxide and nitrogen. In alternative embodiments, the fuel is not necessarily premixed with air. For example, the fuel may simply be sprayed or otherwise vaporized with air and directed over the CPOX catalyst 222.

Fuel gases from the CPOX reactor 218 are fed to the SOFC tubes 204 from an anode feed plenum 224 formed by a feed can 226 attached to the anode feed end tube sheet 214 as denoted by arrows B. By positioning the CPOX reactor 218 above the anode feed plenum 224, liquid fuel may be sprayed onto the CPOX reactor catalyst 222.

By locating the CPOX reactor 218 at a boundary of the hot zone 208, the CPOX reactor 218 may extend partially upward out of the hot zone 208 or even be fully outside the hot zone 218. By locating the CPOX reactor 218 at the top of the hot zone 208, a diameter and length of the CPOX reactor 218 may be sized and configured to accept liquid fuel. Thus, the liquid fuel may be relatively cool until atomized, which advantageously prevents pre-ignition and alleviates fuel delivery problems, particularly those associated with diesel fuel.

Fuel gases (e.g., the reformed fuel) are consumed by electrochemical oxidation in the SOFC tubes 204. Oxidation products and unutilized fuel are exhausted from the SOFC tubes 204 into an anode exhaust plenum 228 formed between the exhaust end tube sheet 216 and the anode exhaust can 230. Anode exhaust gas exits the anode exhaust plenum 228 through an anode exhaust hole 232 in the anode exhaust can 230 as denoted by arrow C.

Cathode Flow

Cathode air is fed to the hot zone 208 through air inlet ports 234 (only one air inlet port 234 shown) as denoted by arrow D. The cathode air passes into an annular gap 236 formed between the outer can 210 and a recuperator can 238. The air inlet ports 234 may be channels oriented normal to the recuperator can 238 (as shown), tangential to the recuperator can 238, or at an angle in between. For tangentially oriented inlet ports 234, the inlet ports 234 are preferably on opposing sides and directed in opposing Cartesian directions to impart a rotational component to the cathode air feed. Without being limited to any theory, it is envisioned that a tangential orientation of the inlet port 234 provides improved performance by improved circulation of the cathode air but any angle and orientation may be utilized.

After passing downward through the annular gap 236, the cathode air then passes into a center feed tube 240 as denoted by arrow E. The feed tube 240 provides the cathode air to the stack 202 in a radial flow direction outward from the feed tube 240, which is centrally located within the stack 202. The center feed tube 240 is perforated with holes 242 in a pattern to provide a desired axial distribution of radial flow of cathode air. The center feed tube 240 may have progressively smaller holes or fewer holes towards a top end in order to accomplish the even axial distribution. In another embodiment, the center feed tube 240 has slots, which are varied in size, number and/or shape along a length thereof. In still another embodiment, the center feed tube 240 is a porous material.

The cathode air flows in a radial direction from the center feed tube 240 across the SOFC tubes 204 as denoted by arrow F. As the cathode air passes across the SOFC tubes 204, oxygen is electrochemically consumed at the tube cathodes and transported as oxygen ions across the electrolyte and into the tube anodes. Thus, oxygen-depleted air is contained within a cathode chamber 244 defined between the tube sheet 214 and support sheet 216, and surrounded by a cathode chamber can 246. As the cathode air approaches the cathode chamber can 246, the direction of the cathode air flow changes from a radial to an axial direction as exemplified by arrow F. The cathode air exhaust exits the cathode chamber 244 in a radial channel 248 between the cathode chamber can 246 and the outside of the anode exhaust can 230.

The cathode air exhaust exits the radial channel 248 through an exhaust gases hole 250 formed in the cathode chamber can 246. Since the exhaust gases hole 250 is near and aligned with the anode exhaust hole 232, anode and cathode exhaust gases begin to mix in a region between the anode exhaust hole 232 and the exhaust gases hole 250 in the cathode chamber can 246.

The exhaust gases hole 250 also marks the beginning of a tail gas combustor 252 where unutilized fuel is further oxidized. The tail gas combustor 252 redirects the exhaust gases into a combustion zone with an optional porous flame holder 254. The porous flame holder 254 can be a porous foam, metal, ceramic, or even a screen structure. The flame holder 254 can optionally be coated with catalyst material to promote catalytic combustion of unutilized fuel gas.

Combusted exhaust gases leaving the tail gas combustor 252 enter a channel formed between the outside of the cathode chamber can 246 and the inside of a recuperator can 238. The inside surface of recuperator can 238 and/or the outside surface of the cathode chamber can 246 may optionally be coated with an active combustion catalyst to provide a second stage tail gas combustor that will complete the combustion of unutilized fuel gases. Hot zone exhaust exits the hot zone through exhaust ports 262 as denoted by arrow H.

The SOFC system 200 provides an efficient counter flow heat exchanger. Heat from the exhaust gases flowing upward along arrow H is transported across the cylindrical wall of the recuperator can 238 into the cold cathode air feed flowing downward along arrow D. Thus, the recuperator or counter flow heat exchanger reduces heat loss in the exhaust by heating the inlet cathode air using heat from the exhaust. Heat loss to the environment is further minimized by the feed end insulation 212a, the recuperator insulation 212b, and the combustor end insulation 212c.

As can be seen, mechanical support for the cells 204 is provided by the anode feed end tube sheet 214 and the exhaust end tube sheet 216. The anode feed end tube sheet 214 supports the stack 202 within the insulation 212a-c. The outer can 210, cathode chamber can 246 and recuperator can 238 may also depend from the anode feed end tube sheet 214. In another embodiment, the outer can 210, cathode chamber can 246 and recuperator can 238 are attached to each other at an outer most radius near the exhaust ports. Lips on these cans 210, 238, 246 may be seam welded or clamped at the lips. The anode feed tube sheet 214 may be supported between the feed can 210 and the cathode chamber can 246. The exhaust end tube sheet 216 may help to support the stack 202 and/or the exhaust can 230. The exhaust end of the stack is free to move axially with differences in thermal expansion between other components in the hot zone. One or more of the cans 210, 230, 238, 246 may include dimpling or similar attachments and modifications to fix radial orientations. For example, the exhaust can 230 and the cathode chamber can 246 may be dimpled to maintain a concentric relationship there between.

Start Up and Operation

Upon start up, the CPOX catalyst 222 is initially ignited with an electrical igniter (not shown) that heats some of the CPOX catalyst 222 to above an ignition temperature. Then, the tail gas combustor 252 is ignited to produce a flame after the flame holder 254. The flame can be ignited using a hot surface igniter or spark igniter (not shown). These two oxidation reactions produce heat for heating the stack 202 to an operating temperature at which point electrical power can be drawn from the SOFC system 200.

In operation, stack temperature, which is measured by a thermocouple 256, is controlled by balancing heat inputs against heat losses. Heat is generated in the SOFC system 200 due to exothermic oxidation reactions in the CPOX reactor catalyst 222 and also by the tail gas combustor 252 and stack inefficiencies. Heat is lost through the insulation 212a-c and ineffective recuperation of hot exhaust. In the SOFC system 200, the thermal balance can be controlled by adjusting the cathode air flow rate, which determines the amount of heat coming out in the exhaust. Also, the fuel feed rate into the hot zone 208 and electrical power being removed significantly impact the thermal balance. For example, one can turn off the load on the SOFC system 200 and reduce the fuel feed to change the thermal balance. Additionally, the cathode air is typically moved by a blower 132 and the fuel feed rate controlled by a fuel pump 130. Thus, the blower 132 and pump 130 can be used to maintain thermal balance.

The SOFC system 200 is also well balanced thermally. The CPOX reactor 218 and tail gas combustor 252 are both exothermic. By locating the CPOX reactor 218 and tail gas combustor 252 at opposing ends of the stack 202, these heat sources are distributed within the SOFC system 200 to reduce the axial temperature variations.

As a large amount of heat is commonly lost through the insulation in prior art small generator systems, the outer tubes are commonly cooler than the centralized tubes, which creates uneven radial temperatures. The SOFC system 200 also addresses this phenomenon by having the relatively cold air inlets 234 on the outside of the heat exchanger, whether it be counter or co-flow. Thus, the colder air envelops the stack 202 to provide an insulative effect and reduce the temperature up against the insulation. Although the cooler air absorbs heat, the cathode air passes into the center feed tube 240, as denoted by arrow E, is still relatively cooler than the central tubes 204. Thus, the cathode air will provide some cooling effect on the central tubes 204 and, thus, the radial temperature will be more uniform.

To withdraw electrical power from the SOFC system 200, an anode power lead 258 penetrates the feed can 226 and a cathode power lead 260 penetrates the feed end tube sheet 214 near an outer diameter thereof. Various wire pairs, such as for the CPOX igniter and tail gas combustor igniter, may pass through the insulation 212a-c boundary to attach to the appropriate igniter, as needed. Alternatively, the wire pairs may pass through the feed port 220, inlet port 234 and/or exhaust port 262 to avoid penetration of the insulation 212a-c.

Preferably, low resistance wires are used for the anode lead 258 and the cathode lead 260 to carry the electric current. The leads 258, 260 pass through the feed can 226 through a feed-through (not shown) that maintains a gas seal on each side of the feed can 226 and also electrically insulates the feed can 226 from the leads 258, 260. The anode power lead 258 passes through the feed can 226 such that the anode lead 258 is exposed to a hydrogen containing environment on the inside of the feed can 226 and an oxygen containing environment on the outside of the feed can 226. Although silver and copper both have low resistivities, copper will oxidize quickly at temperatures over 400° C. and silver, while stable in an oxidizing environment, has high solubilities for both hydrogen and oxygen leading to mechanical failures when insoluble water is generated within the metal as noted in a paper by Singh, P., Yang, Z., Viswanathan, V., and Stevenson, J. W., 2004, entitled "Observations on the Structural Degradation of Silver During Simultaneous Exposure to Oxidizing and Reducing Environments," J. Mater. Eng. Perform., 13, pp. 287-294.

In view of these problems, alternate materials such as nickel or high temperature alloys like inconel have been used, but the higher resistivity of these metals undesirably requires a larger wire diameter. The current can also be carried through the material of the feed can 226. To overcome these drawbacks, the SOFC system 200 preferably extends the wire feed through seal using a tube (not shown) such that the gas boundary is located outside the insulation, thus maintaining a cool temperature for the portion of wire that is exposed to oxygen. As a result, the SOFC system 200 can use either silver, copper or any other electrically conductive material that can withstand oxidizing environments at or around 250° C. as the current carrying anode power lead.

Another Embodiment

Figure 3:
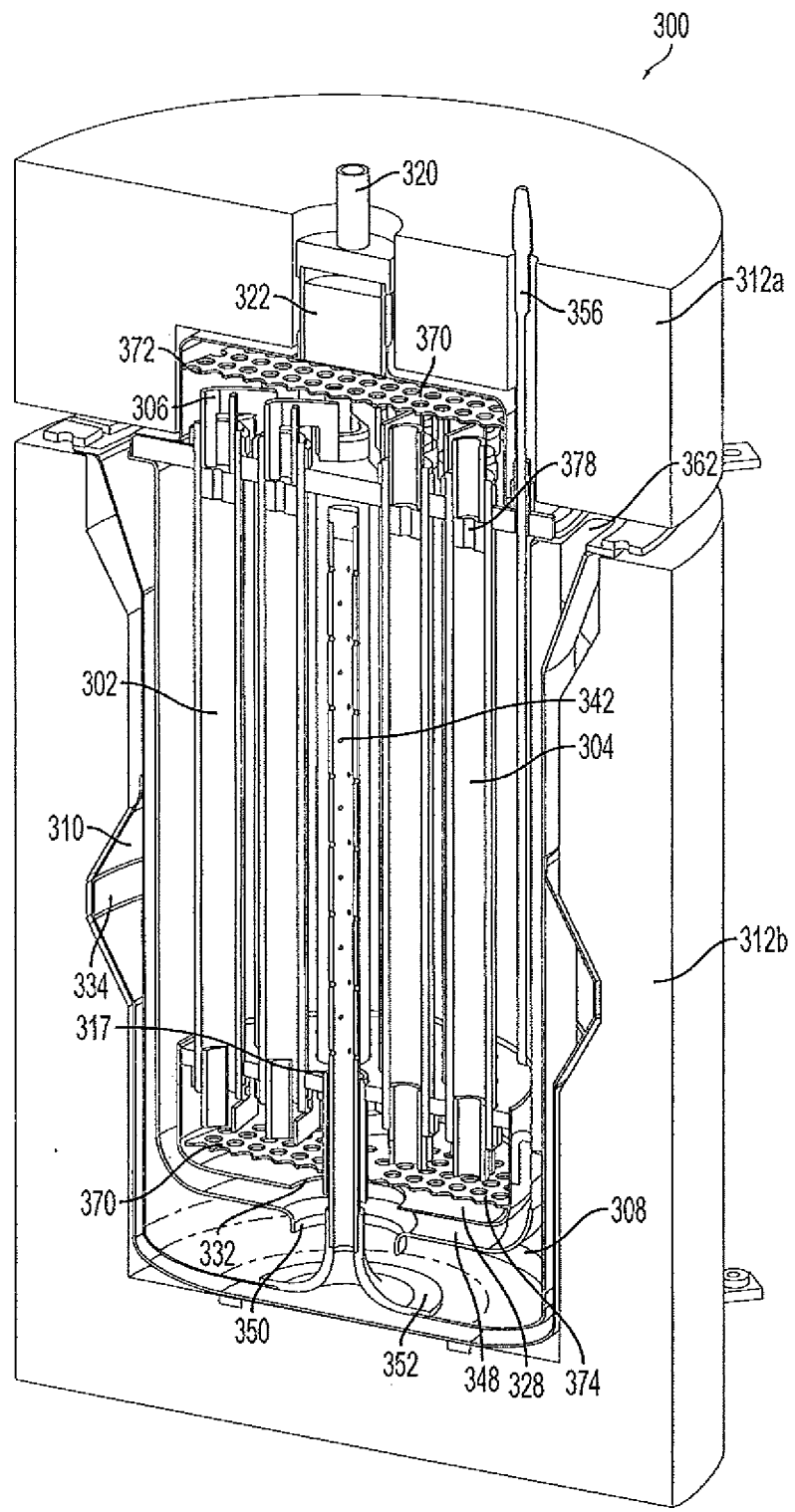
FIG. 3 is a cross-sectional view of another SOFC system with an improved hot zone with improved reactant distribution in accordance with the subject technology.

Now referring to FIG. 3, another embodiment of a SOFC system is shown in cross-section and referred to generally by the reference numeral 300. As will be appreciated by those of ordinary skill in the pertinent art, the SOFC system 300 utilizes similar principles to the SOFC system 200 described above. Accordingly, like reference numerals preceded by the numeral "3" instead of the numeral "2", are used to indicate like elements. The primary difference of the SOFC system 300 in comparison to the SOFC system 200 is the addition of element(s) for improved flow distribution and relocation of the cathode air inlet 334.

Achieving even anode flow distribution among all the SOFC tubes 304 is important for operation at high fuel utilization. As the SOFC system 300 scales to different sizes and multiple rows of tubes 304, distributing gas flow through the tubes 304 can be enhanced by adding a distribution device 370. In the embodiment shown, the distribution device 370 is a gas diffuser 372 in the anode feed end of the stack 302 below the CPOX reactor 322 and another gas diffuser 374 below the bottom end of the stack 302. Both diffusers 372, 374 are not necessarily needed in all applications and either may accomplish the necessary flow re-distribution depending upon the particular application. The diffusers 372, 374 consist of a plate perforated with holes. The diameter of the diffuser holes and their distribution in the plate can also be adjusted to control the gas flow distribution. Alternatively, the distribution device 370 may include restrictors, reshaping of existing surfaces, a baffle, various deflectors, a porous sheet, screen, or other material that helps distribute flow.

The distribution device 370 also includes a flow restrictor 378 in each of the SOFC tubes 304 for improving gas flow. The restrictor 378 can be any device that imposes a controlled pressure drop through each tube 304. Different pressure drops through restrictors in different tubes could be useful to overcome anything that might cause uneven pressure drops through tubes before the restrictors are in place. Examples could be manufacturing or assembly tolerances, cracks in the tubes, intentional design for poor pressure matching between tubes in order to achieve cost reductions, weight savings or any other desirable characteristics. In addition, it is possible that the restrictors might only be used in certain tubes and not others to achieve the desired flow distribution. Preferably, the restrictor 378 is an insert with a controlled hole diameter through which the gas flows. Alternatively, porous plugs and/or perforated disks may be used. In one embodiment, the restrictors or like device are a configuration that has controllable pressure drop characteristics. Furthermore, the flow restrictor 378 could be an integral part of the interconnect or attached to the interconnect to aid in fixing the restrictor location. While the figure shows the restrictor 378 at the inlet end of the tubes 304, multiple restrictors 378 could be used in various locations such as at the outlet end or any place within the tube 304.

Still referring to FIG. 3, the cathode air inlet 334 is relocated away from the exhaust ports 362 in order to provide more control over the temperature distribution within the hot zone 308. The cathode air inlet 334 is located closer to the outlet end of the stack 302. By such arrangement, cooling from the cold cathode inlet air is provided near the tail gas combustor 352, which is typically the hottest location of the hot zone 308. As a result, axial temperature distribution may be accomplished with acceptable reduction in the effectiveness of the recuperator. It is noted that the exhaust gases hole 350, if sized properly, may act as a flame holder for the first stage of the tail gas combustor 352.

The illustrated embodiments are understood as providing exemplary features of varying detail of certain embodiments, and therefore, features, components, elements, and/or aspects of the illustrations can be otherwise combined, interconnected, sequenced, separated, interchanged, positioned, and/or rearranged without materially departing from the disclosed systems or methods. Additionally, the shapes and sizes of components are also exemplary and can be altered without materially affecting or limiting the disclosed technology. Accordingly, while the invention has been described with respect to preferred embodiments, those skilled in the art will readily appreciate that various changes and/or modifications can be made to the invention without departing from the spirit or scope of the invention as defined by the appended claims.

Incorporation by Reference

All patents, published patent applications and other references disclosed herein are hereby expressly incorporated in their entireties by reference.

What is claimed is:

1. A solid oxide fuel cell system comprising:
an elongated stack having a first end and a second end, the stack including a plurality of tubular cells, each cell having an inner radius configured as an anode electrode portion and an outer radius configured as a cathode electrode portion;
a support plate for retaining the stack;
a feed can coupled to the support plate to form an anode feed plenum adjacent the first end of the stack;
a fuel processing reactor in fluid communication with the anode feed plenum for receiving a hydrocarbon fuel and air mixture to provide a rich fuel anode feed stream to the anode feed plenum, wherein the anode feed plenum is in fluid communication with the stack so that the anode feed stream passes through the tubular cells to become an anode exhaust;
an exhaust end tube sheet;
an exhaust can depending from the exhaust end tube sheet, the exhaust can defining an anode exhaust hold; and
a cathode chamber can depending from the support plate and, surrounding the stack and the exhaust can, the cathode chamber can defining an exhaust gas hold near the anode exhaust hole to form a region in which the anode exhaust and the cathode exhaust mix to form a mixed exhaust stream.

2. The solid oxide fuel cell system as recited in claim 1, wherein the fuel processing reactor has a feed tube that extends at least partially out of a hot zone defined by insulation of the solid oxide fuel cell system.

3. The solid oxide fuel cell system as recited in claim 1, further comprising a cathode air feed tube extending substantially centrally through the stack for providing a cathode feed stream across the tubular cells to become a cathode exhaust.

4. The solid oxide fuel cell system as recited in claim 3, wherein the cathode air feed tube extends from the first end to the second end of the stack, and the feed tube defines a plurality of holes to distribute air flow evenly along the length of the air feed tube.

5. The solid oxide fuel cell system as recited in claim 1, further comprising a tail gas combustor at the second end of the stack for oxidizing unutilized fuel in the mixed exhaust stream.

6. The solid oxide fuel cell system as recited in claim 1, further comprising:
a sheath sealing the exhaust end tube sheet and exhaust can about the cathode air feed tube such that an anode exhaust plenum is formed;
an electrical feed-through assembly sealingly mounted in the feed can, the feed-through assembly having a tube such that a gas boundary is located outside a hot zone defined by insulation of the solid oxide fuel cell system; and
an anode power lead passing through the feed-through assembly,
wherein the fuel processing reactor is a catalytic partial oxidation (CPOX) reactor.

7. A solid oxide fuel cell system comprising:
an elongated stack having a first end and a second end, the stack including a plurality of tubular cells, each cell having an inner radius configured as an anode and an outer radius configured as a cathode;
a feed tube extending substantially centrally through the stack for providing a cathode feed stream for the tubular cells to become a cathode exhaust, wherein the feed tube is adapted and configured to facilitate even flow distribution and the feed tube defines a plurality of holes that facilitate the even flow distribution, the plurality of holes being varied in size, shape and number;
an exhaust end tube sheet for sealing the cathode feed stream from an anode exhaust;
an exhaust can depending from the exhaust end tube sheet for forming an anode exhaust plenum, the exhaust can defining an anode exhaust hole, wherein the feed tube extends through the anode exhaust hole;
a cathode chamber can depending from a support plate and surrounding the stack and the exhaust can, the cathode chamber can defining an exhaust gas hole near the anode exhaust hole to form a region in which the anode exhaust and the cathode exhaust mix to form a mixed exhaust stream; and
a tail gas combustor at the second end of the stack for oxidizing unutilized fuel in the mixed exhaust stream.

8. The solid oxide fuel cell as recited in claim 7, wherein the feed tube extends from the first end to the second end of the stack.

9. The solid oxide fuel cell as recited in claim 7, wherein the feed tube is fabricated from a porous material to facilitate even flow distribution.

10. The solid oxide fuel cell as recited in claim 7, further comprising a CPOX reactor producing an anode feed stream coupled to the first end and at least one distribution element for facilitating even flow distribution between the anodes of the tubular cells, wherein the at least one distribution element is selected from the group consisting of a gas diffuser, a porous sheet, screen, reshaping of existing surfaces, a baffle, one or more deflectors, a restrictor, a porous plug, a perforated disk, and combinations thereof placed within flow paths.

11. The solid oxide fuel cell as recited in claim 10, wherein the at least one distribution element is at least one gas diffuser being a plate with a plurality of holes.

12. The solid oxide fuel cell as recited in claim 10, wherein the at least one distribution element is a plurality of flow restrictors for insertion in each of the tubular cells.

13. The solid oxide fuel cell system as recited in claim 7, wherein the tail gas combustor is catalytic.

14. The solid oxide fuel cell system as recited in claim 7, wherein the tail gas combustor is a homogeneous flame burner.

15. The solid oxide fuel cell as recited in claim 7, further comprising:
a feed can coupled to the stack to form an anode feed plenum adjacent the first end of the stack; and
a fuel processing reactor in fluid communication with the anode feed plenum for receiving a hydrocarbon fuel and providing an anode fuel stream to the anode feed plenum, wherein the anode feed plenum is in fluid communication with the stack so that the anode fuel stream passes through the tubular cells to become anode exhaust.

* * * * *

UNITED STATES PATENT AND TRADEMARK OFFICE
CERTIFICATE OF CORRECTION

| | | |
|---|---|---|
| PATENT NO. | : 8,614,023 B2 | Page 1 of 1 |
| APPLICATION NO. | : 13/645054 | |
| DATED | : December 24, 2013 | |
| INVENTOR(S) | : Joseph C. Poshusta et al. | |

It is certified that error appears in the above-identified patent and that said Letters Patent is hereby corrected as shown below:

In the Claims:

Column 11, claim 1, line 16, replace "exhaust hold" with --exhaust hole--.

Column 11, claim 1, line 19, replace "exhaust hold" with --exhaust hole--.

Column 11, claim 1, line 20, replace "exhaust hold" with --exhaust hole--.

Signed and Sealed this
Twentieth Day of May, 2014

Michelle K. Lee
*Deputy Director of the United States Patent and Trademark Office*